(No Model.) 2 Sheets—Sheet 1.
R. A. W. ROSANDER & J. R. PEARSON.
CASH REGISTER.
No. 601,681. Patented Apr. 5, 1898.
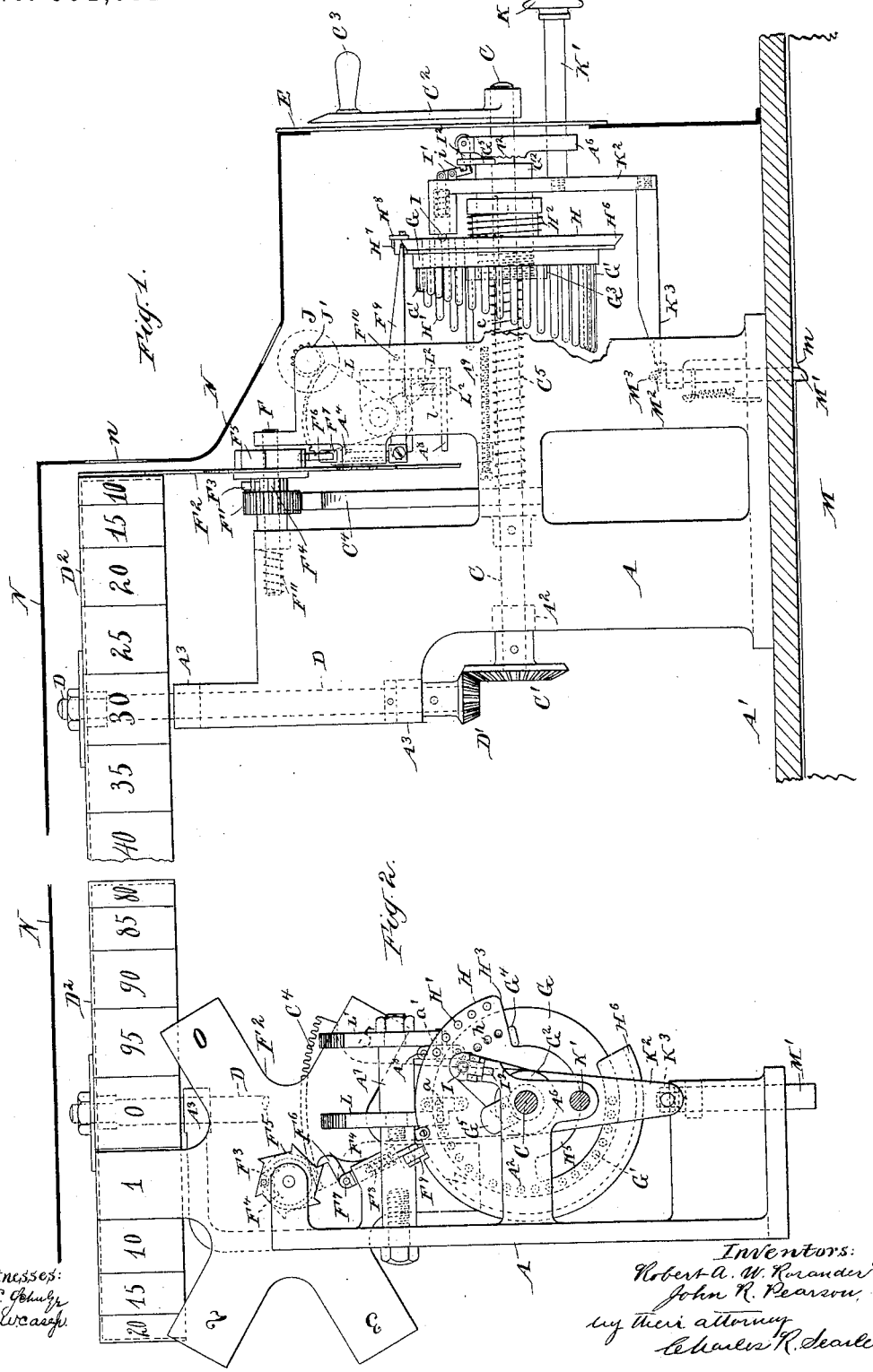

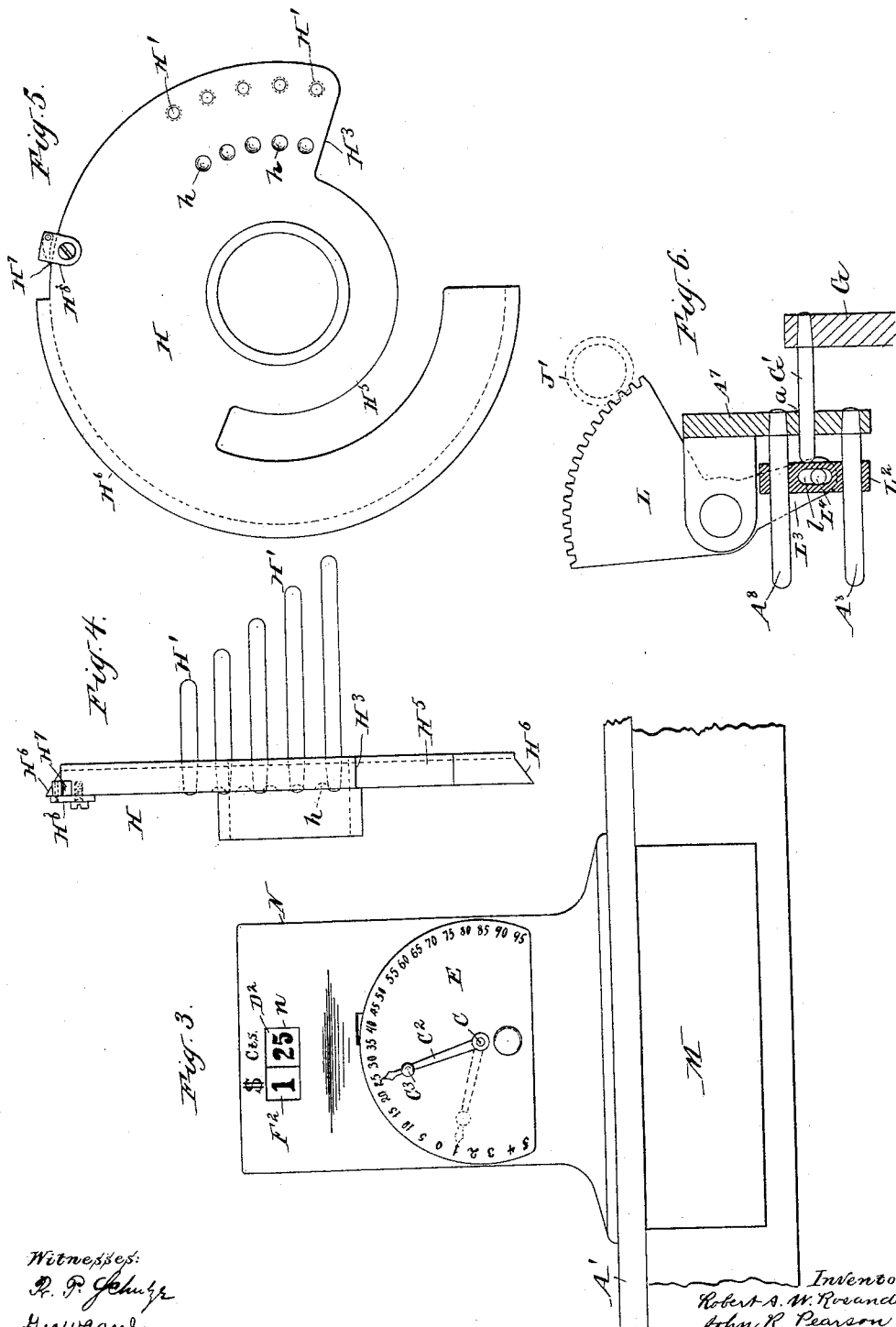

UNITED STATES PATENT OFFICE.

ROBERT A. W. ROSANDER AND JOHN R. PEARSON, OF BROOKLYN, NEW YORK, ASSIGNORS OF THIRTEEN-TWENTIETHS TO FRANK C. GAFFNEY, OF SAME PLACE.

CASH-REGISTER.

SPECIFICATION forming part of Letters Patent No. 601,681, dated April 5, 1898.

Application filed June 16, 1897. Serial No. 640,955. (No model.)

*To all whom it may concern:*

Be it known that we, ROBERT A. W. RO-SANDER, a citizen of the United States, and JOHN R. PEARSON, a subject of the King of Sweden and Norway, residents of Brooklyn, in the county of Kings and State of New York, have invented a certain new and useful Improvement in Cash-Registers, of which the following is a specification.

The invention relates to that class of registers in which the mechanism is operated by the act of moving a pointer to the required figure on a dial. It has for its object the simplification of the mechanism and at the same time providing for the indication and registration of amounts comprising one or several dollars with the fractional portions thereof expressed in cents, the whole operation being effected by the movements of a single pointer on a dial and a thrust upon a single knob. The pointer is secured to a shaft, through which its movements are communicated to a drum bearing figures corresponding to those on the dial and presented at a suitable opening in the casing, showing the cents or fractions of the dollar. The figures representing the number of dollars in the amount registered are arranged on a disk operated by the same shaft when the pointer is swung to the figure desired. The registration is effected by an inward thrust upon a single knob connected to sliding disks carrying pins differing in length and adapted to correspondingly rotate the registering-wheels to the required extent.

The invention also consists in certain details of construction and combinations and arrangements of parts, which will be fully described.

The accompanying drawings form a part of this specification and represent the invention as we have carried it out.

Figure 1 is a side elevation showing the mechanism partly in vertical section and with portions of the casing removed. Fig. 2 is a corresponding front elevation. Fig. 3 is a complete front elevation on a smaller scale. Figs. 4 and 5 are respectively edge and face views of one of the sliding disks or plates on a large scale. Fig. 6 is a vertical section, partly in elevation, showing a portion of the registering mechanism alone.

Similar letters of reference indicate the same parts in all the figures.

A is the framing, mounted on a base A', inclosing the cash-drawer M, which may, as usual, be forced outward and open by a spring (not shown) when released.

C is the main shaft, extending horizontally from front to rear, supported in lugs $A^2 A^2$ on the framing and carrying at its inner end a bevel-gear C', meshing into a corresponding gear D' on the lower end of the vertical shaft D, mounted in lugs $A^3 A^3$ and carrying at its upper end the narrow horizontal drum $D^2$, bearing on its periphery twenty figures, indicating the cents or fractions of the dollar from "0" to "95" in series, each figure being five in advance of the preceding, as "0," "5," "10," "15," "20," "25," and so on. The outer end of the shaft C is provided with a pointer $C^2$, keyed firmly thereon and having a handle $C^3$, by which it and the shaft may be turned. Adjacent to the pointer is a circular or segmental dial E, bearing twenty-five figures equally spaced and at the same distance from the center or shaft C, occupying something more than a complete semicircle. The figures are so arranged relatively to those on the drum that by turning the pointer to any desired cents-figure the shafts C and D will be partially rotated and bring the same figure on the drum $D^2$ opposite the window or opening $n$ in the casing N, and thus show the amount of the purchase, providing it be less than one dollar. The cents-figures extend toward the right from "0" or zero, and toward the left from the same point are the figures "1," "2," "3," "4," and "5," representing dollars.

$F^2$ is a six-armed spider-frame arranged to revolve vertically with a shaft F, mounted parallel to but above and to the left of the shaft C, carrying the loose pinion F', meshing into a toothed segment $C^4$, fixed on the shaft, when presented thereto. On one face of the pinion is a spring-pawl $F^3$, engaging the teeth of a ratchet $F^4$, fixed on the shaft and compelling the latter to turn with the pinion in one direction, but allowing the shaft to remain stationary while the pinion turns idly in the opposite direction.

A ratchet-wheel $F^5$, having as many equally-spaced teeth as there are arms on the spider-disk, is engaged by a dog $F^6$, mounted in the slide $F^7$ in the guide $A^4$, formed on the frame. The slide is urged upward by the spring $F^8$ and is withdrawn, releasing the ratchet $F^5$, by the oscillation of a lever $F^9$ on its center $F^{10}$ by means and for purposes to be described.

The arms of the spider-disk each bear a figure "0" to "5," the uppermost showing through the same window $n$ to the left of the central numeral on the drum $D^2$, indicating, with the latter, the amount of the purchase in dollars and cents.

The operation of the mechanism to show the required figures is simple, consisting of grasping the handle $C^3$ on the pointer and turning the latter toward the left to the numeral indicating the dollars. This movement, through certain connections not yet described, brings the segment $C^4$ into proper mesh with the pinion $F'$ and turns the shaft $F$ and its spider-disk $F^2$ sufficiently to expose the corresponding figure at the window, the drum turning idly and the disk held against reverse motion by the dog $F^6$. The pointer is then carried to the right to the required figure indicating the decimal portion of the purchase, and the drum $D^2$, moving with the shaft $C$, revolves until the same figure is presented at the window at the right of the previous figure.

The mechanism by which the registration is effected and the change made from one sale to the next will now be described.

$G^2$ is a sleeve inclosing the shaft $C$, revolving with the latter but free to move axially thereon by means of a feather engaging in the spline $c$. The inner end of the sleeve is screw-threaded and receives a nut $C^3$, which securely confines a circular disk $G$, carrying a series of nineteen pins $G'$ of differing lengths set concentrically and equally spaced, occupying about one-half of the circle, as shown, and extending inwardly parallel to the shaft and sleeve. Each pin corresponds to one of the numbers from "5" to "95" on the dial and drum and are so set that when the pointer is turned to a given number its corresponding pin will lie opposite to and in line with the hole $a$ in a portion $A^4$ of the framing.

H is a segmental plate mounted loosely between collars on the sleeve $G^2$ and lying adjacent to the disk $G$. It is of larger diameter than the latter and carries five pins $H'$ of differing lengths, arranged circumferentially on a line outside the periphery of the disk and occupying about one-eighth of the circumference, lying parallel to the pins $G'$. A torsional spring $H^2$, attached at one end to the plate and at the other to the sleeve, tends to turn the plate from right to left when released by the disengagement of the sliding bolt I from either of a series of semicircular cavities $h$, arranged on the face opposite the pins $H'$, and hold it against a stop $G^4$, to be described. The pins $H'$ are so spaced that when the bolt I is engaged in one of the cavities the corresponding pin will lie opposite a hole $a'$ in a portion of the framing $A^5$ similar to that described in relation to the pins $G'$ and adjacent to the latter, and will also correspond to the dollar-number on the dial E to which the pointer $C^2$ has been turned.

The registering-wheels J (indicated by the dotted circle) may be of any ordinary or approved construction. We have not shown that portion of the mechanism in detail. The wheels are turned to an extent determined by the length of the pins $G'$ and $H'$, lying opposite the holes $a$ $a'$, when they are thrust inward therethrough. The sleeve $G^2$, with its disk G and plate H, is adapted to slide inward on the shaft C, guided by the spline and feather described, against the force of a spring $C^5$, coiled around the shaft between the segment $C^4$ and nut $G^3$. The thrusting force is applied by the hand upon a knob K on the rod $K'$, extending through the dial E and the guide $A^6$ and secured to the arm $K^2$, loosely inclosing the sleeve and carrying at its upper end the bolt I and at its lower end a bevel-ended extension $K^3$, adapted to release the cash-drawer M.

When the rod $K'$ is thrust inward, one of the pins $G'$, corresponding to the cents indicated, and one of the dollar-pins $H'$, if the purchase includes such amount, enter each their corresponding holes $a$ and $a'$ and partially rotate the toothed segments L and $L'$, which are in mesh with the registering-pinion $J'$. The segments and their connections are similar each to the other, and a description of one will suffice.

$A^8$ $A^8$ are guide-pins set in the framing or bracket $A^7$ near the hole $a$, carrying a sliding yoke $L^2$, having a vertical slot $l$ in its middle portion, receiving a pin $L^4$ on an arm $L^3$ of the segment L. The yoke $L^2$ is held normally against the inner face of the bracket $A^7$ by a spring, (not shown,) and when the pin $G'$ enters the hole the yoke is forced inward to an extent determined by the length of the pin and the thrusting stroke. The latter is uniform and is governed by an adjustable stop $A^9$, set in the framing, against which the nut $G^3$ strikes and arrests the inward movement. As the pins differ in length each to the other, it will be easily seen that each will swing the arm $L^3$ through a greater or less arc, and a corresponding greater or less movement of the registering mechanism results.

$G^4$ is a lug on the outer face of the disk G, against which the shoulder or offset $H^3$ on the plate H rests when the latter is not held by the bolt I, and it is through this lug that motion is communicated to the plate. When the pointer $C^2$ is swung toward the left, it carries the disk G with it, and as the lug $G^4$ is in contact with the shoulder on the plate the latter is forced to move also until the pointer is stopped opposite the desired dollar-figure on the dial E. The plate is then held by the engagement of the bolt I in the corresponding cavity, and the pointer is swung to the right to the required cents-figure, the concentric slot H⁵ allowing the lug G⁴ to traverse to the full extent necessary to reach the highest number on the dial with the pointer. The same inward thrust on the rod K' registers the amount of the purchase and also opens the cash-drawer M. The latter is subject to the force of a thrusting-spring (not shown) tending to throw the drawer open, resisted by a spring-dog M', guided in the framing and carrying at its upper end a roller M³ on an overhung pin M². The thin edge of the beveled extension K³ lies just below the roller, and the inward movement raises the dog M' sufficiently to withdraw it from engagement in the notch $m$ and allow the spring to act.

To the shaft F and framing A is attached a spring F¹¹, tending by its torsional force to turn the spider-disk to the left and bring the zero thereon to the exposed position. Further movement in that direction is prevented by a fixed stop. (Not shown.)

H⁷ is a swinging dog carried in an arm H⁸, attached to the plate H at about the point shown. It allows the free end of the lever F⁹ to pass freely in one direction; but on turning the pointer from one of the dollar-figures—as "3," for instance—back to zero and again to the dollar-figures, or from cent-figures to dollar-figures, the end of the lever is lifted by the passing of the dog H⁷, withdrawing the spring-dog F⁶ and allowing the spider-disk to return to zero.

If the purchase amount includes both dollars and cents figures, the registering-thrust for that amount does not release the spider-disk F², for the reason that the lever F⁹ then lies in the plain or unflanged portion of the plate H, and the latter slides inward without lifting it, the plate being held in position by the sliding bolt I until the termination of the outward or return stroke. Then the plate will be freed and will turn by the force of its spring H² until its shoulder H³ brings up against the lug G⁴. In this position the lever F⁹ will lie in the beveled portion of the plate, and in the succeeding thrust it will be lifted and return the spider-disk to zero, provided the amount of this second sale be less than one dollar or in the cent-figures only. The inward thrust causes the free arm of the lever F⁹ to ride upon the bevel of the plate H, thereby depressing the opposite end, to which is attached the slide F⁷, lowering the latter against the force of the spring F⁸ and withdrawing the dog F⁶ from its engagment with the ratchet-wheel F⁵. The spider-disk F² thus released is immediately returned to zero by the unwinding of the spring F¹¹, wound upon the shaft F and attached at one end to the shaft and at the other to the framing. If that second sale contain dollars also or dollars alone, the movement of the lever or pointer C² to the left to the required figure on the dial releases the spider-disk by the above-described action of the dog F⁷, and it immediately returns to zero in time for its pinion F' to be properly engaged by the segment C⁴ and be set to the new figure.

The sliding bolt I is automatically released near the termination of the outward movement by striking its lever I' against the dog I² and is held normally in the withdrawn condition by such contact, leaving the plate H free to be revolved upon the sleeve G² by the action of its spring. The same movement of the lever described above when the purchase amount contains cents only allows the bolt I to protrude and engage the plate H in the cavity corresponding to the zero-pin and the same figure on the spider-disk. This is accomplished by the lug G⁵ on the sleeve G², passing beneath the dog I² and lifting it sufficiently to allow its nose to enter the groove or notch $i$, provided for the purpose in the lever I', deep enough to provide the motion necessary for the forward movement of the bolt. The thrust on the knob K carries forward the lever I', and the spring-dog I² immediately drops again to its lowest position ready to be again struck by the lever on the return movement and release the plate H.

Modifications may be made in the forms and proportions and in the mechanical details of many of the parts without departing from the principle of the invention or sacrificing its advantages.

The device may be arranged to indicate and register amounts containing any number of cents up to ninety-nine instead of, as here shown, confined to fractions containing multiples of five. If the purchases are always less than one dollar, a single disk with the proper number of pins will serve.

Any approved form of shutter may be employed, operated by the inward thrust of the rod K', to uncover the opening $n$ and disclose the amount indicated. To avoid complication, the shutter has been omitted from this description, as has also the exact construction of the registering mechanism.

We claim—

1. In a cash-register, two indicators, one bearing a series of numbers indicating dollars and the other a series indicating fractions thereof, adapted to be exposed at an opening in the casing in proper relation to each other, in combination with a single lever connected to both, adapted when swung in one direction to operate the dollars-indicator and in the other direction to operate the fractional indicator, a registering mechanism, and a single thrust-rod operating the registering mechanism to register both numbers, all substantially as herein specified.

2. In a cash-register, a drum bearing a series of numbers indicating the fractional parts of a dollar, a shaft connecting to the drum, a disk bearing a series indicating the dollars and operated from the same shaft, an opening in the casing through which the said figures indicating the amount of the purchase in dollars and fractions are exposed in proper relation to each other, a lever fixed to the shaft to turn the latter, and connections whereby the movement of the lever in one direction operates the dollars-indicator and in the other direction operates the fractional indicator, all combined and arranged to serve substantially as herein specified.

3. A shaft, a drum bearing a series of numbers indicating fractional parts of a dollar and turning with the shaft, and an operating-lever fixed to the shaft, in combination with a disk bearing a series of numbers indicating dollars, a pinion connected to said disk and a toothed segment carried by said shaft and meshing with said pinion, all arranged to serve in a cash-register, substantially as herein specified.

4. A shaft, a drum bearing a series of numbers indicating fractional parts of a dollar and turning with the shaft, and an operating-lever fixed to the shaft, in combination with a disk bearing a series of numbers indicating dollars, a loose pinion connected to said disk to turn the latter in one direction and move idly in the opposite direction, a holding means adapted to prevent the reverse movement of the disk, and a toothed segment mounted on said shaft and meshing into said pinion, all substantially as herein specified.

5. In a cash-register, a shaft operating an indicator, in combination with a disk carrying a series of pins of different lengths corresponding to the numbers on the indicator and adapted when thrust forward to present to the registering mechanism the pin corresponding to the number to be registered and to operate said registering mechanism to an extent governed by the length of the pin, all substantially as herein specified.

6. In a cash-register, a drum bearing a series of numbers indicating fractional parts of a dollar, a disk bearing a series indicating dollars, and a shaft operating both indicators, in combination with disks or plates arranged to slide on said shaft, each carrying a series of pins of differing lengths, those on one disk corresponding to the numbers on one indicator and the others to those on the other indicator, adapted when thrust forward to present to the registering mechanism the pins corresponding to the dollars and fractions thereof and operate the registering mechanism to an extent governed by the length of such pins, all substantially as herein specified.

7. In a cash-register, two indicators, one bearing a series of numbers indicating dollars and the other a series indicating fractions thereof, adapted to be exposed at an opening in the casing in proper relation to each other, in combination with a single lever connected to both, adapted when swung in one direction to operate the dollars-indicator and in the other direction to operate the fractional indicator, a registering mechanism, a drawer-opening mechanism, and a single thrust-rod operating the registering mechanism to register both numbers and also release said drawer, all substantially as herein specified.

8. The shaft C, the pointer $C^2$ and toothed segment $C^4$ fixed on said shaft, the gears $C'$ and $D'$, shaft D and drum $D^2$ mounted thereon, in combination with the shaft F, the spider-disk $F^2$ and the ratchets $F^4$ and $F^5$ fixed thereon, the loose pinion $F'$ meshing with said toothed segment and having a pawl $F^3$ engaging one of said ratchets, a dog $F^6$ engaging the other ratchet, and the torsional spring $F^{11}$ tending to turn the said shaft F in opposition to the dog and its ratchet, all substantially as herein specified.

9. The drum $D^2$ and spider-disk $F^2$ and their operating means, in combination with the ratchet $F^5$ on said disk, the dog $F^6$ engaging said ratchet, and the spring-actuated slide $F^7$ and releasing-lever $F^9$, and means for operating the latter all substantially as herein specified.

10. The shaft C and its spider-disk and drum bearing respectively a series of numbers indicating dollars and a series indicating fractions thereof, in combination with the disk G and plate H arranged to slide on said shaft, each bearing a series of pins $G'$, $H'$ of differing lengths, a registering mechanism for each series consisting of a slotted yoke $L^2$, guides $A^8$ therefor, toothed segment L having the arm $L^3$ and pin $L^4$ engaged in said yoke, and meshing with the wheel J, the said yoke adapted to be struck by one of the pins in the series and be driven to an extent determined by the length of the pin, and correspondingly move the said registering mechanism, all substantially as herein specified.

11. The shaft C and its pointer $C^2$, the sleeve $G^2$ mounted on the shaft and turning therewith and adapted to slide axially thereon, the disk G and its series of pins $G'$ fixed on the sleeve, the plate H and its series of pins $H'$ mounted on the said sleeve with liberty to turn thereon, a torsional spring $H^2$ connecting said plate and sleeve, a lug $G^4$ carried by said disk and engaging said plate to turn the latter when the shaft is turned in one direction, the sliding bolt I adapted to engage one of a series of cavities $h$ on said plate, the arm $K^2$ mounted on the said sleeve and carrying said bolt, the rod $K'$ and its knob K whereby the disk and plate may be thrust inward on said shaft, and a registering mechanism adapted to be operated to varying extents depending on the lengths of the pins presented thereto, all combined and arranged to serve substantially as and for the purposes herein specified.

12. The drum $D^2$ and spider-disk $F^2$, and their operating means, in combination with the ratchet $F^5$ on said disk, the dog $F^6$ engaging said ratchet, slide $F^7$, releasing-lever $F^9$, and the plate H having the beveled edge H⁶ adapted when thrust forward to engage and lift the free end of said lever and release said spider-disk, all substantially as herein specified.

13. The drum D² and spider-disk F², and their operating means, in combination with the ratchet F⁵ on said disk, the dog F⁶ engaging said ratchet, slide F⁷, releasing-lever F⁹, and the plate H having the beveled edge H⁶, and the dog H⁷ carried by said plate, adapted to lift the free end of the lever and release the spider-disk when the plate is turned in one direction, all substantially as herein specified.

14. The plate H mounted on the sleeve G² and having the series of pins H' of differing lengths and a corresponding series of cavities $h$, in combination with the sliding bolt I adapted to engage said cavities, the lever I' controlling the bolt and having the groove $i$, the dog I² adapted to be struck by said lever and thereby withdraw said bolt, the lug G⁵ on said sleeve adapted to lift said dog when presented to the latter and allow it to lie inoperatively in said groove, all substantially as herein specified.

15. The sleeve G² turning with the shaft C and free to slide axially thereon, the disk G fixed on said sleeve, the plate H carried by the sleeve with liberty to turn thereon, the series of pins G' and H' carried by said disk and plate and adapted to operate a registering mechanism, the arm K² inclosing said sleeve and moving axially therewith, a beveled extension K³ carried by the arm, a spring-catch M' controlling the cash-drawer M, operated by said extension, and the rod K' and single knob K for operating the registering mechanism and releasing the cash-drawer by a single thrust, all combined and arranged to serve substantially as herein specified.

In testimony that we claim the invention above set forth we affix our signatures in presence of two witnesses.

ROBERT A. W. ROSANDER.
JOHN R. PEARSON.

Witnesses:
CHARLES R. SEARLE,
R. P. SCHULZE.